Oct. 5, 1954        A. A. MEYER        2,690,819
ELECTROMAGNETIC FRICTION DEVICE
Filed Jan. 9, 1951        2 Sheets-Sheet 1
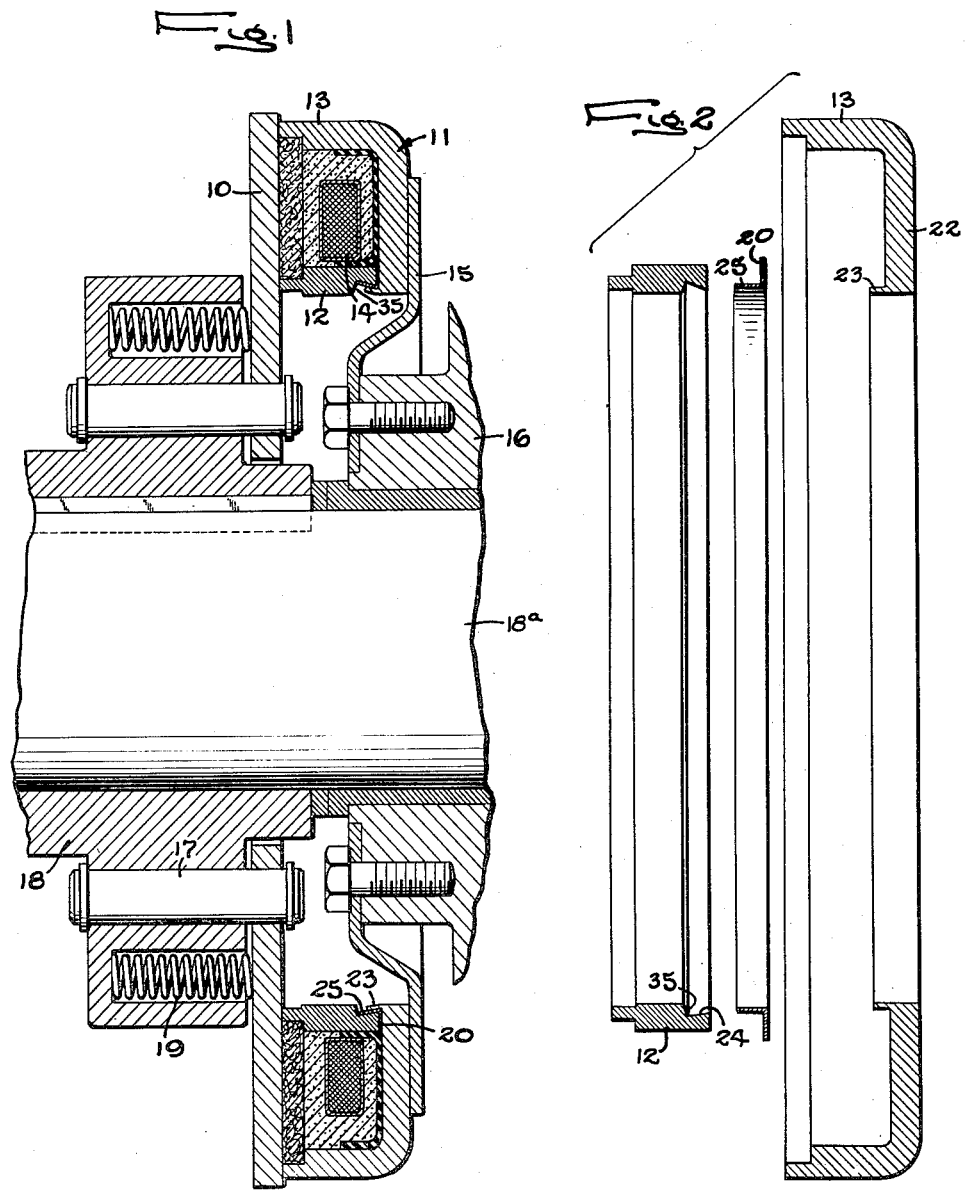
INVENTOR
Arthur A. Meyer
By Carlson, Pitzner, Hubbard & Wolfe
ATTORNEYS Oct. 5, 1954     A. A. MEYER     2,690,819
ELECTROMAGNETIC FRICTION DEVICE
Filed Jan. 9, 1951     2 Sheets-Sheet 2
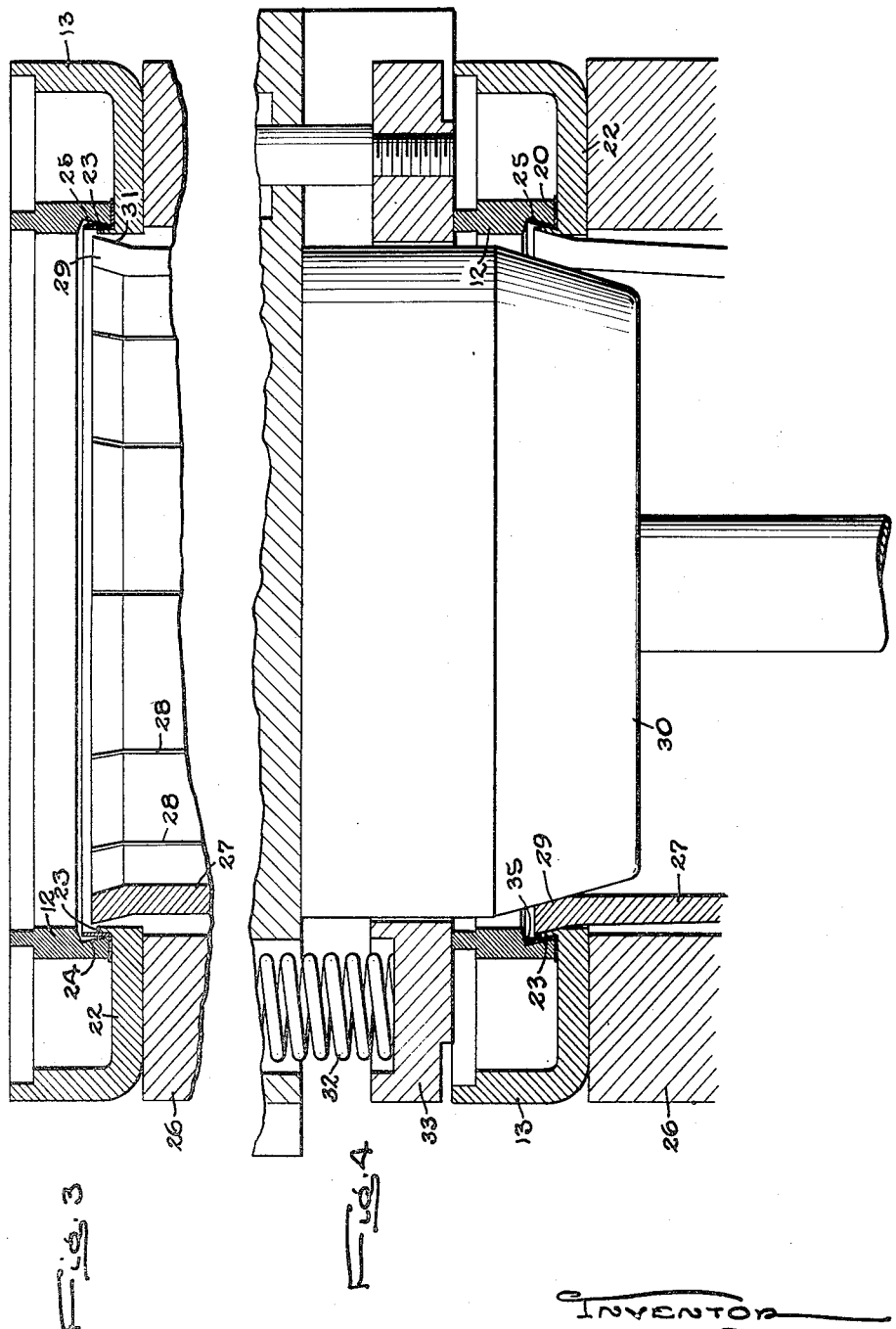

Patented Oct. 5, 1954

2,690,819

UNITED STATES PATENT OFFICE 2,690,819

ELECTROMAGNETIC FRICTION DEVICE

Arthur A. Meyer, South Beloit, Ill., assignor to Warner Electric Brake & Clutch Company, South Beloit, Ill., a corporation of Illinois Application January 9, 1951, Serial No. 205,043

3 Claims. (Cl. 188—164)

1

This invention relates to magnets of the type commonly used in electromagnetic friction clutches and brakes and having two unlaminated and rigidly connected parts forming the magnet poles and separated by a non-magnetic gap for reducing residual magnetism.

The general object is to secure the two magnetic parts together and form the residual gap in a manner which is simpler and less expensive than the methods heretofore employed while at the same time reducing a gap of uniform reluctance and without distorting the core structure as a whole.

A more detailed object is to fasten the two parts of the magnet together in abutting relation through the medium of a projection rigid with one part and crimped or bent into a recess in the other part.

The invention also resides in the novel construction and arrangement of the projection and recess to permit ready assembly and interlocking of the parts and the non-magnetic separating element.

Other objects and advantages of the invention will become apparent from the following detailed description taken in connection with the accompanying drawings, in which Figure 1 is a fragmentary diametrical cross-sectional view of an electromagnetic friction brake embodying the novel features of the present invention.

Fig. 2 is an exploded diametrical sectional view of the parts of the magnet.

Figs. 3 and 4 are fragmentary sectional views illustrating the manner of assembling and interlocking the magnetic parts.

In the drawings, the invention is shown for purposes of illustration incorporated in a magnetic friction brake comprising a generally flat armature ring 10 adapted for axial gripping engagement with the face of a rigid magnet ring 11 of generally U-shaped cross-section having inner and outer pole pieces 12 and 13 disposed on opposite sides of a multi-turn winding 14 securely anchored in the magnet ring. Segments of wear resistant material are seated in the pole pieces substantially flush with the pole faces.

Through the medium of a disk 15 secured to the back of the magnet, the latter is mounted on a suitable support 16. The inner peripheral portion of the armature ring is apertured to receive pins 17 on a collar 18 keyed to the driving shaft 18ª. Springs 19 urge the armature ring into light mechanical contact with the face of the magnet.

2

The pole pieces 12 and 13 are formed by two separate rings of unlaminated magnetic material rigidly secured together and separated at their abutting surfaces by a narrow non-magnetic gap which, in this instance is defined by an annular strip 20 of non-magnetic material such as brass. The outer pole piece 13 comprises a cylindrical right angular flange integral with the outer edge of a flat ring 22, the two forming a ring L-shaped in cross-section. Near its inner edge, the ring 22 abuts against one end of the cylindrical ring 12, the opposing surfaces being separated by a flat portion of the non-magnetic strip 20.

In accordance with the present invention, the two rings 12 and 22 are secured rigidly together by mechanically interlocking parts formed on the two rings in a crimping or bending operation. For this purpose, a relatively thin narrow rib or flange 23 is cut, forged, or otherwise formed on the ring 22 at the extreme inner edge thereof, the rib projecting in the direction of the pole piece 13 and, as initially formed, being disposed substantially concentric with the axis of the magnet ring. While the rib may be interrupted or divided into a plurality of angularly spaced parts, it may be formed more easily as a complete annulus.

The other part of the interlocking connection is a surface 24 formed on the ring 12 by cutting a groove 35 around the interior of the ring at the end thereof which abuts the ring 22. Herein, the surface 24 is frusto-conical and diverges to the end of the ring 12.

To prevent the interlocking of the parts from reducing the effectiveness of the residual gap, a flange 25 is formed integral with the strip 20 and initially disposed substantially perpendicular to the strip as shown in Figs. 2 and 3. In the final assembly, the flange lies against the surface 24 and separates this surface from the bent over rib 23. Thus, the flange 25 when backed by the surface 24 forms a shoulder around which the bent rib is extended to clench the parts rigidly together.

Outward bending of the rib 23 to lock the magnet parts together may be effected easily with the die arrangement shown in Figs. 3 and 4. With the magnet ring 22 resting on a support 26, the non-magnetic ring is fitted over the rib 23 in telescoping relation. Then, the ring 12 is lowered onto the strip 20, the rib 23 serving to hold the parts telescoped therewith in proper abutting relation with respect to the ring 22 as shown in Fig. 3. In the final pressing operation, the ring 12 is held against the support 26 by springs 32 acting through a plate 33.

Disposed within the support 26 for axial movement relative thereto is a stationarily mounted tube 27 formed at its upper end with angularly spaced longitudinal slots 28. The end portion 29 is flared outwardly at the angle of the surface 24 on the ring 12 and is thus adapted to be expanded by lowering of a conical member 30 into the split end of the tube 27 to the position shown in Fig. 4. As the jaws 29 move outwardly from the position shown in Fig. 3, their outer conical surfaces 31 engage the rib 23 and bend the same and the flange 25 outwardly and around the shoulder surface 24. This motion is limited to the position shown in Fig. 4 by which time, the rib and the flange will have been crimped tightly against the surface 24 thus locking the rings together in a rigid structure while leaving the two separated at all of the abutting surfaces by a gap determined by the thickness of the strip 20 and the flange 25.

It will be apparent that the construction above described enables a magnet core of U-shaped cross-section to be produced from sheet metal stampings, the residual gap between them being formed as an incident to the operation of clenching the parts together. This is a simple pressing operation and does not involve heating of the parts that would be conducive to distortion. For the same reason, the residual gap is of uniform width determined only by the thickness of the strip 20.

I claim as my invention:

1. In an electromagnetic friction device, the combination of, a magnetic pole piece, a second magnetic piece abutting against said first piece and defining a pole spaced from the pole face of said first piece, a winding secured between said pieces, one of said pieces having an outwardly opening recess therein adjacent the area of abutment with the other piece, a thin strip of non-magnetic material separating the abutting areas of said pieces and extending around the edge of said one piece and into said recess, and a projection rigid with said other piece and bent into said recess against said strip to clench the two pieces together while leaving all of the opposing parts thereof separated by said strip.

2. In an electromagnetic friction device, the combination of, a magnetic ring, an annular magnetic piece having one edge portion abutting against one end of said ring, said ring having a peripheral shoulder on the side thereof adjacent the edge of said piece, a layer of non-magnetic material separating the abutting areas of said pieces and extending around said shoulder, and a flange integral with and upstanding from said edge and bent around said shoulder to lock said piece and said ring rigidly together while leaving all of the opposing areas thereof separated by said strip.

3. In an electromagnetic friction device, the combination of, a magnetic pole piece, a second magnetic piece abutting against said first piece, one of said pieces having an outwardly opening recess therein defining a shoulder adjacent and facing away from the area of abutment with the other piece, a layer of non-magnetic material separating the abutting areas of said pieces and extending around said shoulder into said recess, and a projection rigid with said other piece and bent into said recess around said shoulder against said layer to clench the two pieces together.

References Cited in the file of this patent

UNITED STATES PATENTS

| Number | Name | Date |
|---|---|---|
| 2,255,161 | Gray | Sept. 9, 1941 |
| 2,353,750 | Oetzel | July 18, 1944 |
| 2,522,622 | Laurant | Sept. 19, 1950 |

FOREIGN PATENTS

| Number | Country | Date |
|---|---|---|
| 562,922 | Great Britain | July 21, 1944 |